(12) United States Patent
Senior et al.

(10) Patent No.: US 8,131,010 B2
(45) Date of Patent: Mar. 6, 2012

(54) HIGH DENSITY QUEUE ESTIMATION AND LINE MANAGEMENT

(75) Inventors: Andrew W. Senior, New York, NY (US); Yun Zhai, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 973 days.

(21) Appl. No.: 11/830,270

(22) Filed: Jul. 30, 2007

(65) Prior Publication Data

US 2009/0034846 A1    Feb. 5, 2009

(51) Int. Cl.
G06K 9/46    (2006.01)
H04N 7/18    (2006.01)

(52) U.S. Cl. ........ 382/103; 382/190; 382/192; 348/149; 348/150

(58) Field of Classification Search .................. 382/103, 382/190, 192; 348/150, 149
See application file for complete search history.

(56) References Cited

U.S. PATENT DOCUMENTS

| | | | |
|---|---|---|---|
| 5,097,328 A * | 3/1992 | Boyette ........................ 348/150 |
| 5,121,201 A * | 6/1992 | Seki .............................. 348/143 |
| 5,509,082 A * | 4/1996 | Toyama et al. ............... 382/104 |
| 5,581,625 A * | 12/1996 | Connell ........................ 382/100 |
| 6,195,121 B1 * | 2/2001 | Huang et al. .................. 348/150 |
| 6,263,088 B1 * | 7/2001 | Crabtree et al. .............. 382/103 |
| 7,123,166 B1 * | 10/2006 | Haynes et al. ............. 340/932.2 |
| 2003/0105685 A1 * | 6/2003 | Millikan .......................... 705/30 |
| 2003/0107649 A1 | 6/2003 | Flickner et al. |
| 2005/0073585 A1 | 4/2005 | Ettinger et al. |
| 2005/0105773 A1 * | 5/2005 | Saito et al. .................... 382/104 |
| 2006/0291695 A1 | 12/2006 | Lipton et al. |
| 2007/0127774 A1 | 6/2007 | Zhang et al. |
| 2007/0253595 A1 * | 11/2007 | Sorensen ...................... 382/103 |

* cited by examiner

Primary Examiner — Vu Le
Assistant Examiner — Soo Park
(74) Attorney, Agent, or Firm — Anna L. Linne; Hoffman Warnick LLC (57) ABSTRACT

The present invention is directed to the measurement of attributes of a queue. A method for measuring an attribute of a queue in accordance with an embodiment includes: acquiring a plurality of images of a queue; extracting features from the images of the queue; analyzing the extracted features; and measuring the attribute based on the analysis of the extracted features; wherein the analyzing further comprises analyzing the extracted features at a plurality of successive time points to determine successive correspondences between the extracted features, and wherein the measuring further comprises measuring the attribute based on the successive correspondences

10 Claims, 7 Drawing Sheets

HIGH DENSITY QUEUE ESTIMATION AND LINE MANAGEMENT

FIELD OF THE INVENTION

The present invention relates to the field of digital video technologies. In particular, the present invention relates to the field of visual surveillance systems capable of measuring one or more attributes of high-density traffic queues acquired by imaging devices.

BACKGROUND OF THE INVENTION

Effective management of dense-traffic queues and waiting lines is a critical task in many environments, such as government buildings, heavy traffic roads, theme parks, sport stadiums, retail stores, etc. For example, in a supermarket, a manager can optimize usage of a check-out lane based on the current waiting line status. In another example, the queue density and speed information of vehicles on a highway can be used to provide accurate traffic reports.

Due to the nature of high-density queues, it is extremely difficult to reliably segment and track "blobs", which correspond to semantically meaningful objects in the scene. Thus, traditional blob-based object tracking algorithms are not capable of managing high-density traffic queues.

Given the difficulties of extracting meaningful and reliable global information of the blobs, many approaches have turned their focus to the analysis of local information of the dense flow and developed trackers based on image points. Many of the point trackers assume consistency in the neighborhood of the points being tracked, such as scale invariance or Affine invariance. The image points are tracked to form trajectories, which can be used in further scene or activity analysis. The main drawback of using point-trackers in dense-traffic queue analysis is that they only capture the local properties of the queue and do not have the ability to represent the objects in the scene. Therefore, point-trackers are not able to provide more global descriptions of the queue, such as the number of objects in the queue or the density of the queue.

Accordingly, there is a need for a solution that addresses these and other deficiencies of the related art.

SUMMARY OF THE INVENTION

The present invention relates to visual surveillance systems capable of measuring one or more attributes of high-density traffic queues acquired by imaging devices.

A first aspect of the present invention is directed to a method for measuring an attribute of a queue, comprising: acquiring a plurality of images of a queue; extracting features from the images of the queue; and measuring the attribute based on the analysis of the extracted features; wherein the analyzing further comprises analyzing the extracted features at a plurality of successive time points to determine successive correspondences between the extracted features, and wherein the measuring further comprises measuring the attribute based on the successive correspondences A second aspect of the present invention is directed to a system for measuring an attribute of a queue, comprising: a system for acquiring a plurality of images of a queue; a system for extracting features from the images of the queue; a system for analyzing the extracted features; and a system for measuring the attribute based on the analysis of the extracted features; wherein the system for analyzing is configured to analyze the extracted features at a plurality of successive time points to determine successive correspondences between the extracted features, and wherein the system for measuring is configured to measure the attribute based on the successive correspondences.

A third aspect of the present invention is directed to a program product stored on a computer readable medium, which when executed, measures an attribute of a queue, the computer readable medium comprising program code for: acquiring a plurality of images of a queue; extracting features from the images of the queue; analyzing the extracted features; and measuring the attribute based on the analysis of the extracted features; wherein the analyzing further comprises analyzing the extracted features at a plurality of successive time points to determine successive correspondences between the extracted features, and wherein the measuring further comprises measuring the attribute based on the successive correspondences A fourth aspect of the present invention is directed to a method for deploying an application for measuring an attribute of a queue, comprising: providing a computer infrastructure being operable to: acquire a plurality of images of a queue; extract features from the images of the queue; analyze the extracted features; and measure the attribute based on the analysis of the extracted features; wherein the analyzing further comprises analyzing the extracted features at a plurality of successive time points to determine successive correspondences between the extracted features, and wherein the measuring further comprises measuring the attribute based on the successive correspondences.

The illustrative aspects of the present invention are designed to solve the problems herein described and other problems not discussed.

BRIEF DESCRIPTION OF THE DRAWINGS

These and other features will be more readily understood from the following detailed description taken in conjunction with the accompanying drawings.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As detailed above, the invention relates to visual surveillance systems capable of measuring one or more attributes of high-density traffic queues acquired by imaging devices.

Figures 1, 4:
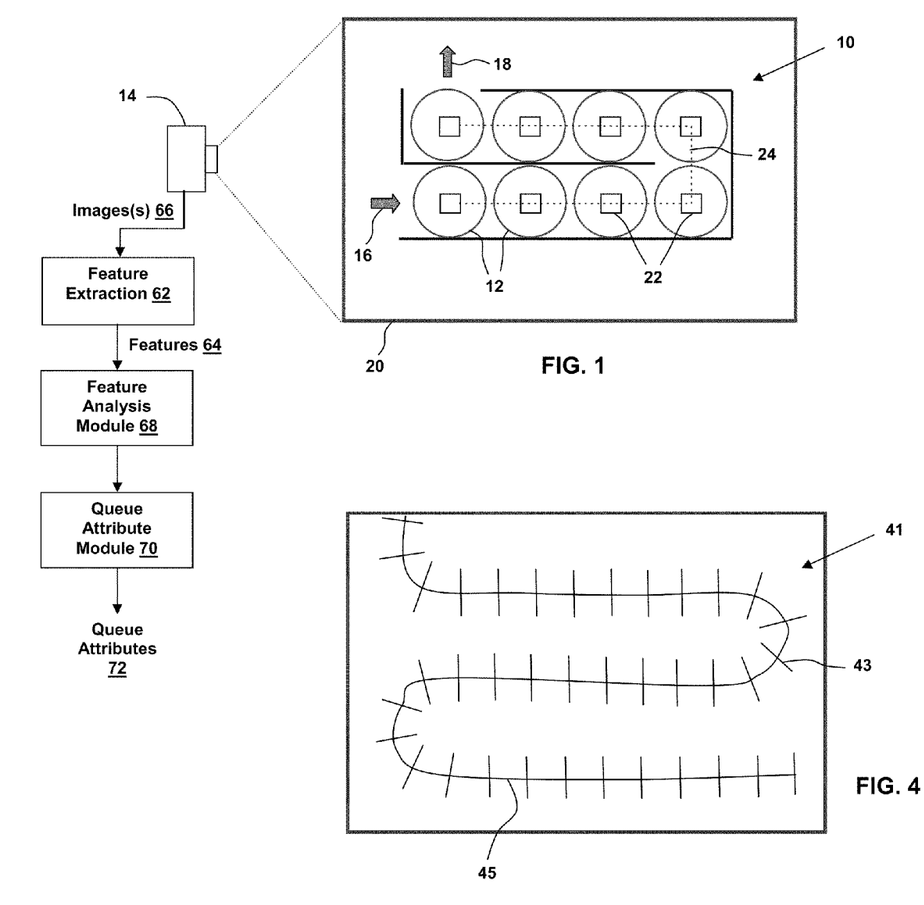
FIG. 1 depicts an illustrative queue and an illustrative system in accordance with an embodiment of the present invention.
FIG. 4 depicts an illustrative use of spaced landmarks along a path of a queue in accordance with an embodiment of the invention.

The present invention provides a framework for determining, measuring, and/or estimating (hereafter referred to collectively as "measuring") attributes of queues acquired, for example, by direct overhead or oblique cameras with fixed settings. An illustrative queue 10 is depicted in FIG. 1. The queue 10 is defined as a series of ordered and connected locations 12 in the field-of-view (FOV) of a video camera 14, where the starting and ending locations represent the entry point 16 and exit point 18 of the queue 10. The queue 10 represents a physical span in a scene 20. The queue 10 usually contains objects 22, such as humans, shopping carts, animals, vehicles, and/or the like, moving in a particular direction from the entry point 16 to the exit point 18 of queue 10. Often, one or more attributes of the queue 10 are of interest, such as the speed of the traffic movement in the queue 10, the number of moving objects 22 in the queue, the density of the queue 10, the average waiting time to exit the queue 10, and/or the like. Herein, a "waiting line" 24 is defined as the actual line formed by the objects 22 present in the queue 10. The waiting line 24 can vary based on the number and density of the objects 22 in the queue 10, as well as other factors.

The attributes of a queue (e.g., queue 10, FIG. 1) can be classified into a plurality of different categories based on their nature. For example, one category contains attributes that can be measured at a given point in time. These attributes are called "time-point based attributes". Examples of time-point based attributes of a queue can include, for instance, queue density and the number of objects in the queue. A second category contains attributes that can only be measured over a period of time and which cannot be measured using a single image frame. These attributes are called "duration-based attributes". Examples of duration-based attributes of a queue can include, for instance, the average moving speed at a given location in the queue and the overall speed of the entire queue. Due to the different nature of these categories, they are measured in two separate ways. To this extent, time-point based attributes are measured based on the analysis of single video frame, while duration-based attributes are measured based on an analysis of video features over time (e.g., by analyzing a plurality of sequential video frames).

Figure 2:
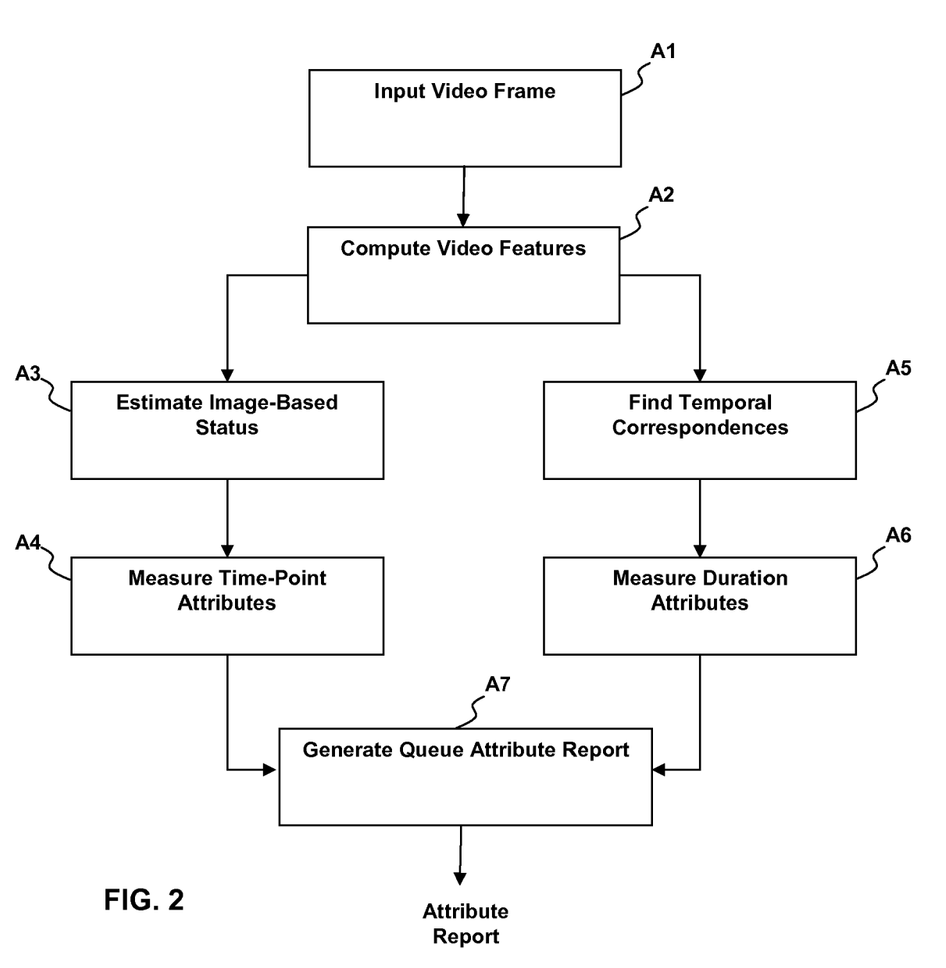
FIG. 2 depicts a flow diagram of an illustrative process for measuring queue attributes in accordance with an embodiment of the present invention.

FIG. 2 depicts a flow diagram of an illustrative process for measuring queue attributes in accordance with an embodiment of the invention. Given a new video frame (A1), video features are computed for further analysis (A2). The queue attributes are measured in two ways. In the first model, time-point based attributes are estimated based on the analysis of single image features (A3, A4). The duration-based attributes are computed based-on the time-varying video features (A5, A6). Finally, a queue attribute status report is generated (A7).

Figure 3:
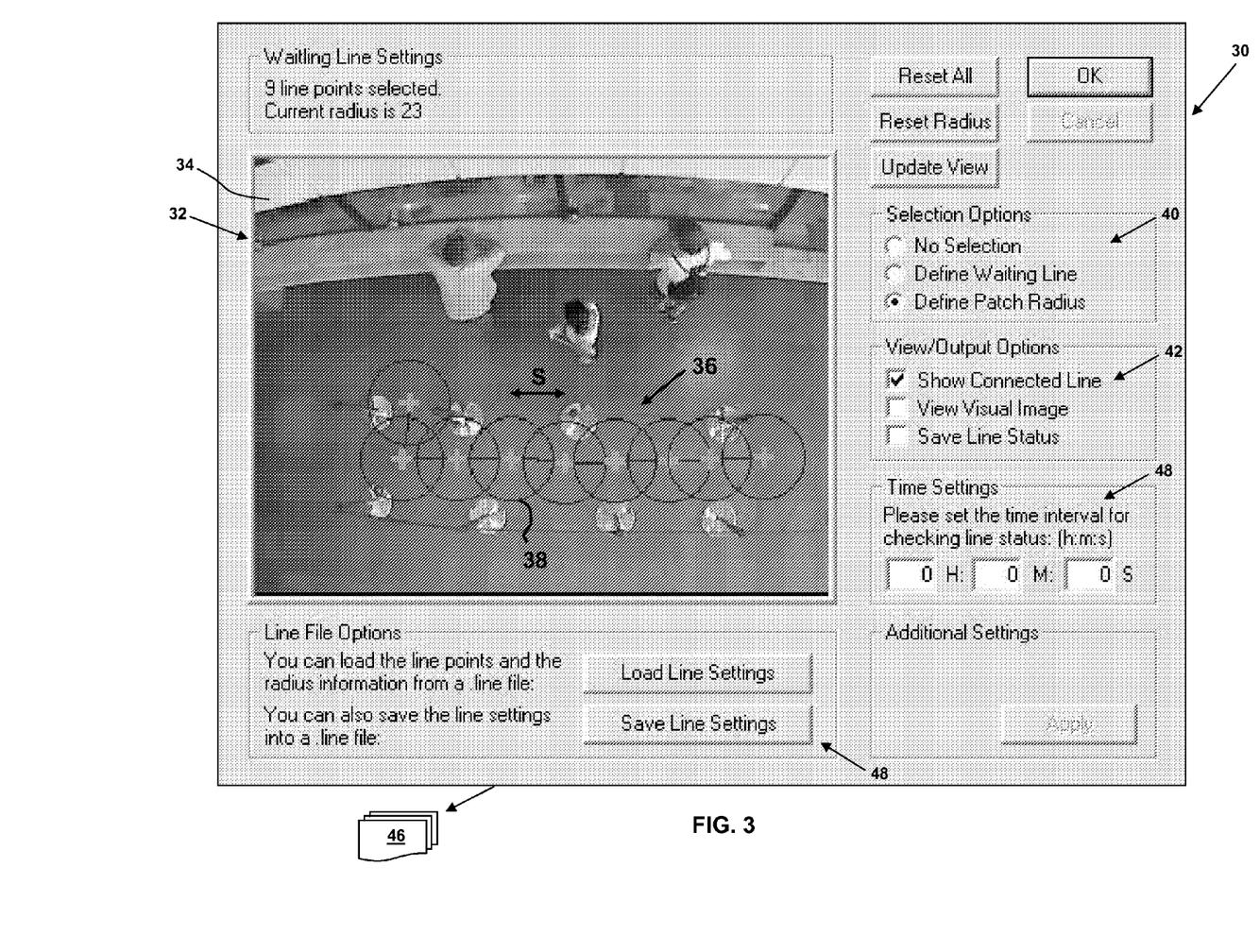
FIG. 3 depicts an illustrative graphical user interface (GUI) in accordance with an embodiment of the present invention.

Referring now to FIG. 3, there is depicted an illustrative graphical user interface (GUI) 30 in accordance with an embodiment of the invention. The GUI 30 includes a window 32 containing an image frame 34 captured by a video camera (e.g., video camera 14, FIG. 1). Given a queue 36 to be analyzed, the path of the queue 36 is sketched out by a series of circular "ground patches" 38, which are designed to capture the local properties of the queue 36. The ground patches 38 can be drawn on the image frame 34 manually and/or automatically using any suitable solution. A sufficient number of ground patches 38 are defined in order to cover the entire queue 36. The spacing S between the ground patches 38 can be made coarser or finer. Coarser sampling along the path can leave a gap between ground patches 38, while finer sampling results in a greater overlap between ground patches 38, thus providing more connectivity between the ground patches 38. The same spacing S can be provided between each pair of ground patches 38. Different spacings S can also be used.

In the GUI 30, a user has the ability to define the queue 36 using a set of controls 40. The visual output can be specified using a set of controls 42. The parameters of the queue 36 can be saved to and loaded from profile files 44 using a set of controls 46. The frequency of queue attribute estimation can be adjusted using a set of timing controls 48.

In the following discussion, the measurement of queue attributes is mainly based on the use of the ground patches 38. However, the invention is not limited to the ground patches 38 and can be used in conjunction with other types of queue definitions including, for example, rectangular-shaped patches, connected point series, equally spaced landmarks along the queue path, and/or the like. An illustrative use of spaced landmarks 43 along the path 45 of a queue 41 is depicted in FIG. 4. The measurement of queue attributes can also be carried out using a series of dynamic locations, such as the positions of moving persons in a waiting line.

Since the camera settings are typically fixed, pixels belonging to moving foreground objects can be detected by comparing current pixel values to a previous model. One common approach is through the use of background subtraction (BGS). The basic approach of BGS is to learn the background models of each pixel over time. The background models can be constructed, for example, using color, gradient, and edge information of the image pixels. Given a new video frame with moving objects, features of each pixel are compared to corresponding background models. If the features deviate significantly from the background models, the pixel is classified as a foreground pixel. Connected foreground pixels form foreground blobs, which cover the foreground objects in the field-of-view. If the object is in the queue, its foreground blob is then captured by one or more ground patches. If a significant percentage of a ground patch is covered by the foreground pixels, the ground patch will be declared as a foreground ground patch, and corresponding features will be extracted from the ground patch. These features are used to measuring both time-point based and duration-based queue attributes.

One limitation of the BGS-based approach is that when the queue is crowded for a long period of time, the background model will no longer be meaningful since the background is rarely visible. In this situation, a smoothed-frame differencing technique can be applied instead of the traditional BGS method. In frame differencing, the current frame is compared with one or more previous frames to detect any inconsistencies. The inconsistencies between frames represent the motion caused by the foreground object(s). In this case, the ground patches capture the frame differences instead of BGS generated pixels, and similarly to above, if a significant portion of a ground patch is covered by frame differences, this ground patch will be classified as a foreground ground patch.

There are many choices of the image features. For instance, the image features can be either low level features (such as color histograms, edge histograms, color moments, etc.), or high-level semantic features (such as humans, animals, vehicles, shopping carts, etc.), that are generated using, for example, object detection methods. The option of using a specific feature(s) is based on a user's preference and application requirements. Simpler (low-level) features yield faster queue attribute estimation, while more complex (often high-level) features can be used to handle more sophisticated tasks. A combination of features can also be used, for example, color histograms and detected persons. A similarity match using color histograms can comprise a color histogram intersection.

Time-point based queue attributes can be measured using features obtained from a single video frame. In an embodiment of the present invention, three queue attributes are of interest: (1) the length of the waiting line inside the queue, (2) the number of objects in the queue, and (3) the density of the queue.

Figure 5:
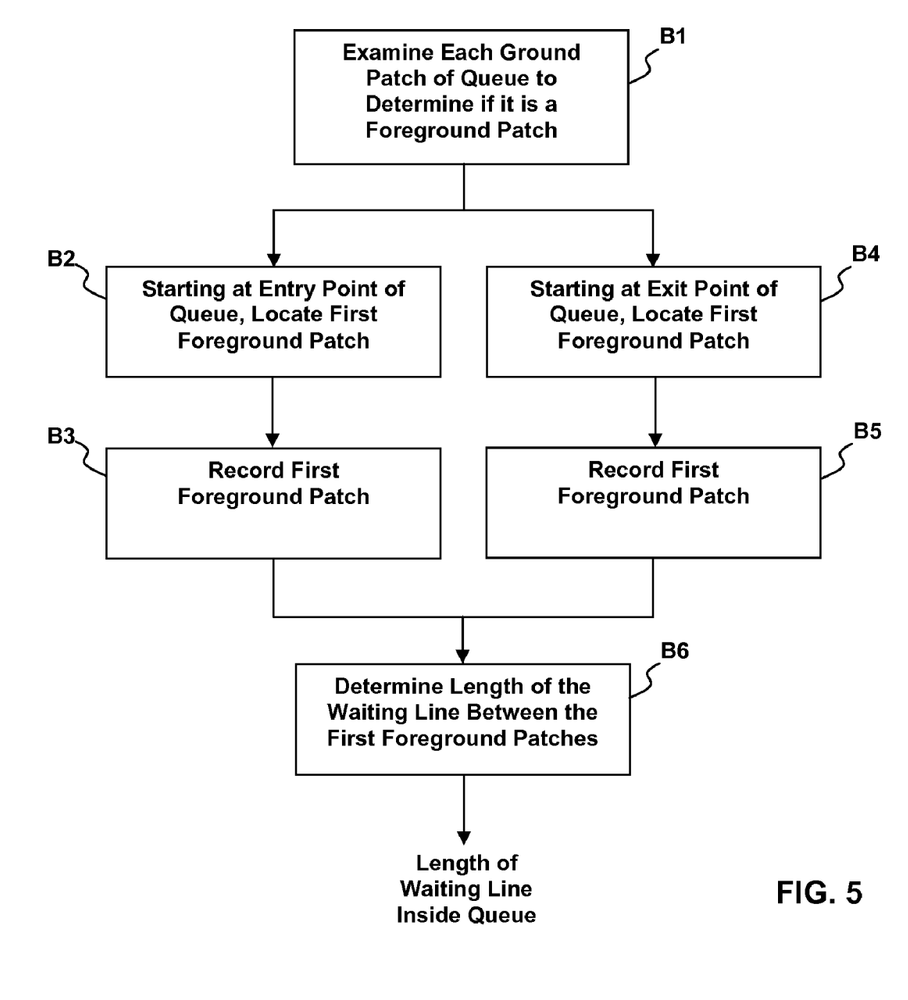
FIG. 5 depicts a flow diagram of an illustrative process for determining waiting line length in a queue in accordance with an embodiment of the present invention.

The waiting line length can be computed as depicted in FIG. 5. Initially, each ground patch of the queue is examined (B1) to determine if it is a foreground ground patch or not. Starting from the ground patch at the entry point of the queue, the first foreground ground patch is located (B2) and its location is recorded (B3). Similarly, starting from the ground patch at the exit point of the queue, the first foreground ground patch is located (B4) and its location is recorded (B5). Then, the waiting line length inside the queue is determined (B6) based on the distance between the first foreground patch at the entry point of the queue and the first foreground patch at the exit point of the queue. This distance comprises the distance it takes to walk between the first foreground patch at the entry point of the queue to the first foreground patch at the exit point of the queue along the queue path (i.e., it is not the direct Euclidean distance between the two ground patches).

In many situations, users are interested in both the waiting line length in the queue and the actual number of objects in the queue. There are several reasons for this. One reason is that there can be gaps between objects in the queue. This causes the waiting line length to be over-estimated. Another reason is that a user may only be interested in a specific type of object(s). One example arises in a supermarket, where a queue can have both customers (humans) and shopping carts. In this case, a user may only be interested in the number of customers in a queue.

Figures 6, 7, 8:
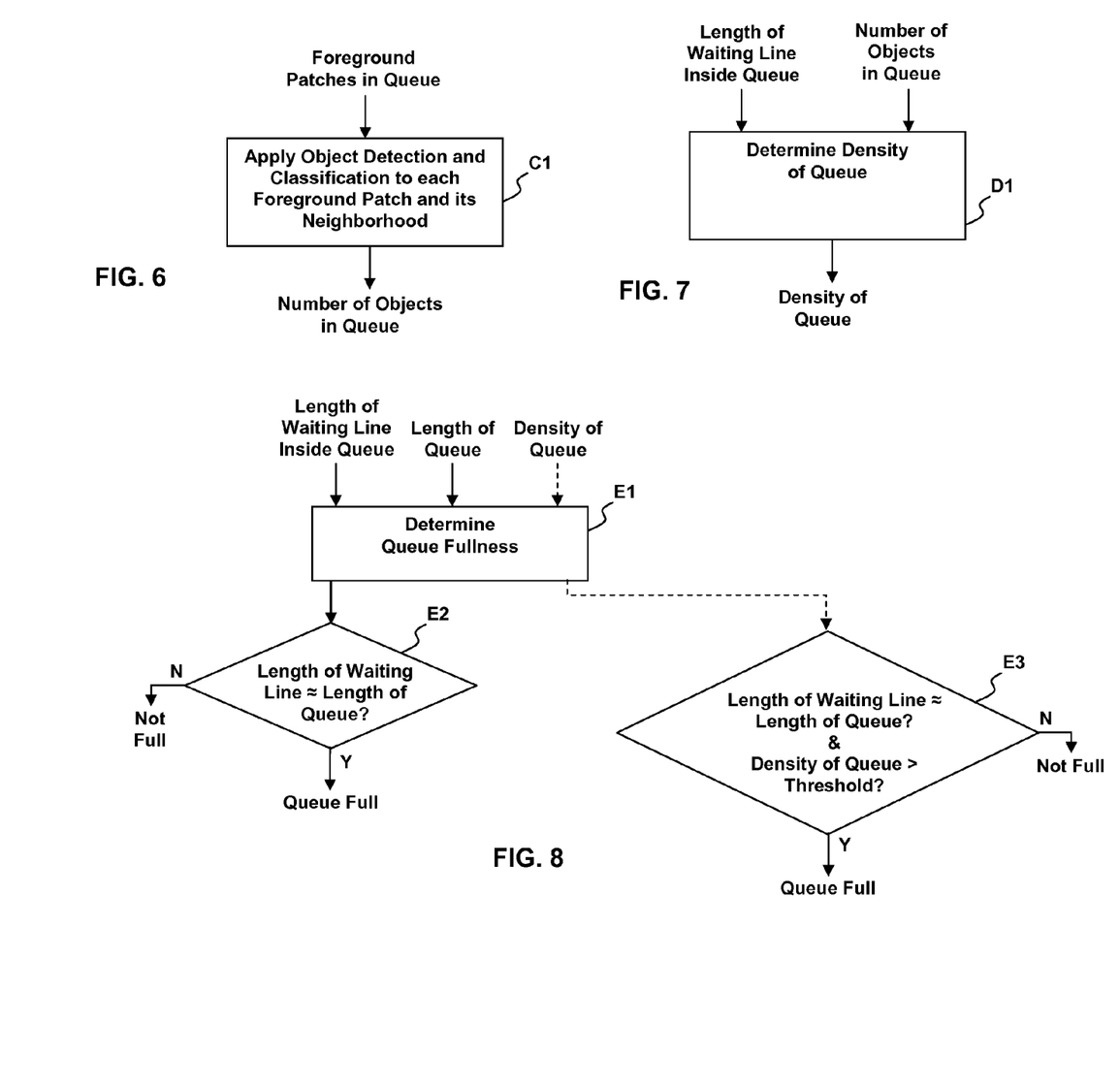
FIG. 6 depicts a flow diagram of an illustrative process for determining the number of objects in a queue in accordance with an embodiment of the present invention.
FIG. 7 depicts a flow diagram of an illustrative process for determining the density of a queue in accordance with an embodiment of the present invention.
FIG. 8 depicts a flow diagram of an illustrative process for determining queue fullness in accordance with an embodiment of the present invention.

As depicted in FIG. 6, to measure the number of objects in a queue, object detection and classification are applied (C1) to the foreground ground patches and their neighborhood in the queue to discover target objects (e.g., humans in the supermarket case). Examples of approaches that can be used for object detection/classification include: Support Vector Machines (SVM), Principal Component Analysis (PCA), template matching, AdaBoost, and/or the like. In an embodiment of the present invention, a person template is applied to estimate the actual number of persons in the queue. If other objects (e.g., cars, carts, animals, etc.) are of interest, corresponding object detectors can be used. Other approaches for measuring the number of objects in a queue are also possible.

The density of a queue is related to two queue attributes: waiting line length and the number of objects in the queue. If the queue is empty, the density of the queue is defined as zero. If the queue is not empty, the density of the queue is determined (D1, FIG. 7) as the ratio of the number of objects in the queue and the waiting line length. If the number of objects is not of particular interest to a user, the density of the queue can be defined as the ratio of the number of foreground ground patches in the queue and the waiting line length. This definition captures all types of objects in the queue and excludes the gaps in between objects.

Using the measurement of the waiting line length inside the queue, another queue attribute, "queue fullness", can be determined (E1, FIG. 8) by comparing the waiting line length with the queue length. If the length of the waiting line is equal or near to the length of the queue (E2), then the queue is declared as full. This attribute can be relaxed to incorporate (E3) the density information, such as the queue is full only if the waiting line length is near or equal to the length of the queue, and the density of the queue is above a desired threshold. The "queue fullness" attribute is important in many situations for waiting line management, such as stores, parks, public facilities, etc.

Figure 9:
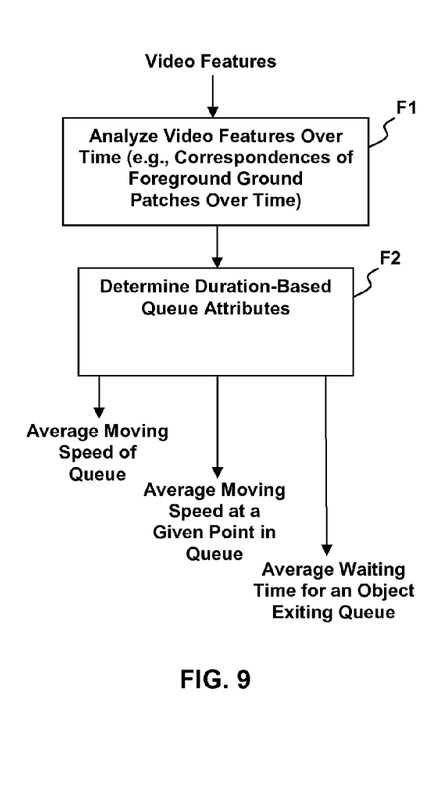
FIG. 9 depicts a flow diagram of an illustrative process for determining duration-based attributes of a queue in accordance with an embodiment of the present invention.

As depicted in FIG. 9, an analysis (F1) of video features over a period of time is used to determine (F2) duration-based queue attributes. In an embodiment of the present invention, several duration-based attributes are of interest: (1) the average moving speed of the queue; (2) the average moving speed at a given point in the queue; and (3) the average waiting time for an object exiting the queue.

To estimate the above-listed queue attributes, the correspondences of foreground ground patches are established over time. For example, the feature of a color histogram can be extracted from each foreground ground patch to provide color statistics. This can be achieved using any solution. Each foreground ground patch keeps a history of its extracted features at different time points. If an object moves inside the queue, it will pass through consecutive foreground ground patches. Thus, by finding matches between the foreground ground patches over time, the trace of the moving object can be reconstructed. Furthermore, the speed of the object's movement can also be estimated using the distance it travels and the time it takes to travel.

There are several ways for establishing foreground ground patch correspondences. One solution is to apply a Dynamic Time Warping (DTW) technique. Another solution to perform bipartite graph matching, where the foreground ground patches at two time points are considered as nodes in a graph, and the patch-to-patch similarity is considered as the edges between nodes. Other solutions, such as string matching and sequence alignment, are also applicable.

Once the temporal correspondences of foreground ground patches are determined, the speed at a given location in the queue can be computed based on the displacement between the location and its correspondence in the next time point. The average speed of the queue location is the average of the all the speed samples that are obtained over a given time period. Each foreground ground patch keeps a history of the times (frequency) its speed information is computed. The average moving speed of the entire queue is computed as the weighted average of the average speeds of all the foreground ground patches. The weights are controlled by the frequencies of the foreground ground patches. The higher frequency a foreground ground patch has, the more weight is assigned to the foreground ground patch in the average speed estimation of the entire queue.

There are several ways of measuring the attribute of the average time for an object to exit a queue. In a first solution, an object is tracked iteratively by applying a ground patch matching technique. In particular, a foreground ground patch containing the object is located. This foreground ground patch is further matched with its correspondences in a consecutive time point until reaching the exit point of the queue. The time difference between the time point at which the object is initially tracked and the time point at which it reaches the exit point of the queue is the total time duration it takes to pass through and exit the queue. The same process is repeated for all the objects in the target time period, and the average time of an object exiting a queue can be obtained. Another solution is to consider the average speed of the queue. This is more implicit, since it does not consider any actual object. In this solution, the average time of an object exiting the queue is computed as the ratio between the total length of the queue and the average speed of the queue movement.

Users can manually specify a queue and its width by defining a series of locations along a path. Besides manual definition, a queue can also be automatically derived from a training process in an either online or offline fashion. One approach to obtain the queue path is to build a "super track" by clustering the trajectories generated from individual moving objects in the queue.

Figure 10A:
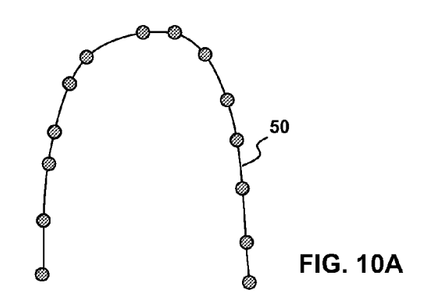
FIGS. 10A-10C depict the formation of a super-track in accordance with an embodiment of the present invention.
Figure 10B:
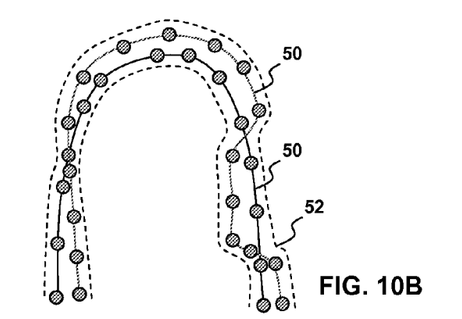
Figure 10C:
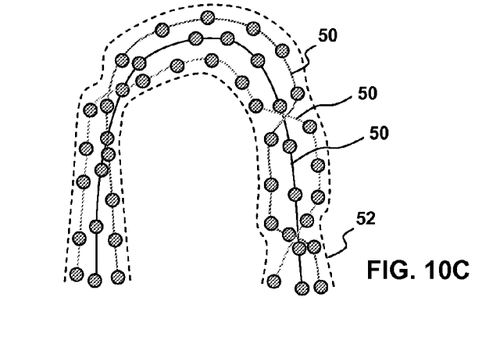

Training can be performed, for example, when the moving objects can be clearly distinguished from each other (e.g., low density traffic) and can be correctly tracked using a suitable tracking algorithm. Once the training objects are tracked, their trajectories are grouped together to obtain a super-track, which lays out the path of the queue. As shown in FIGS. 10A-10C, a super-track is initialized using a single object trajectory 50. The super-track envelope 52 (the width-span of the super-track) is iteratively updated by including more and more training object trajectories 50. The queue path is defined as the major axis of the generated super-track, while taking the envelope as the queue width. The ground patches (or other forms of queue representation) are automatically selected by equally sampling along the queue path or by detecting prominent points along the queue where the spatiotemporal curvature (speed and acceleration) is significant.

Referring again to FIG. 1, there is depicted a system 60 for measuring attributes of a queue in accordance with an embodiment of the present invention. The system 60 includes a feature extraction system 62 for extracting features 64 from the image(s) 66 captured by the video camera 14, a feature analysis system 68 for analyzing the extracted features 64 (e.g., correspondences between features), and a queue attribute system 70 for providing attributes 72 (e.g., duration-based attributes, time-point based attributes, etc.) of the queue 10 based on the analysis performed by the feature analysis system 68.

Figure 11:
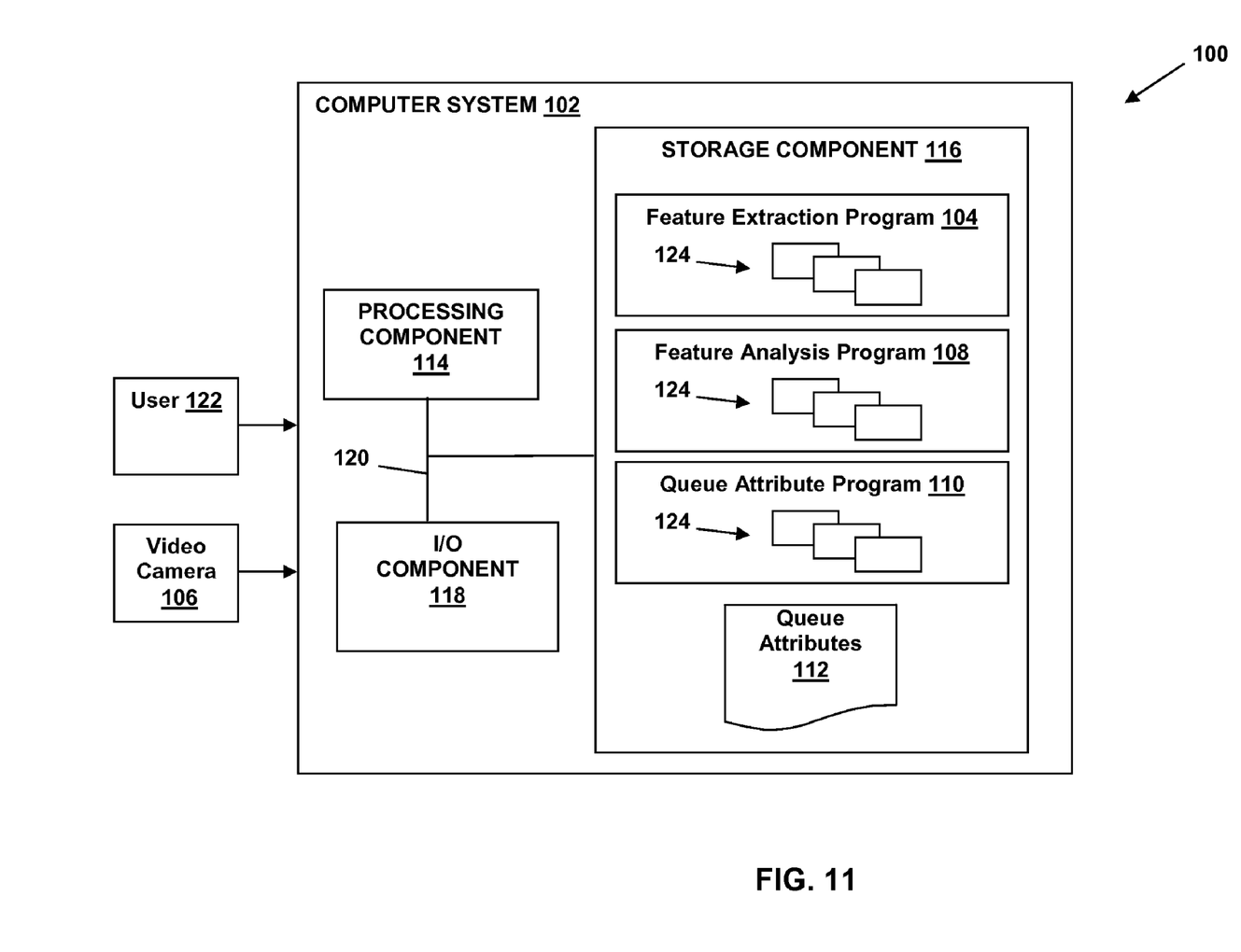
FIG. 11 depicts an illustrative environment for implementing embodiment(s) of the present invention.

FIG. 11 shows an illustrative environment 100 for measuring attributes of a queue in accordance with any/all embodiments of the present invention. To this extent, environment 100 includes a computer system 102 that can perform the processes described herein. In particular, the computer system 102 is shown as including a feature extraction program 104, which makes computer system 102 operable to extract features of a queue from image(s) captured by a video camera 106, a feature analysis program 108, which makes computer system 102 operable to analyze the extracted features, and a queue attribute program 110 for providing attributes 112 (e.g., duration-based attributes, time-point based attributes, etc.) of the queue, by performing the processes described herein.

The computer system 102 is shown including a processing component 114 (e.g., one or more processors), a storage component 116 (e.g., a storage hierarchy), an input/output (I/O) component 118 (e.g., one or more I/O interfaces and/or devices), and a communications pathway 120. In general, the processing component 114 executes program code, such as the feature extraction program 104, feature analysis program 108, and queue attribute program 110, which are at least partially stored in storage component 116. While executing program code, the processing component 114 can read and/or write data to/from the storage component 116 and/or the I/O component 118. The communication pathway 120 provides a communications link between each of the components in computer system 102. The I/O component 118 can comprise one or more human I/O devices, which enable a human user 122 to interact with the computer system 102 (e.g., via the GUI 30, FIG. 3), and/or one or more communications devices to enable other computer system(s) to communicate with the computer system 102 using any type of communications link.

In any event, the computer system 102 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the feature extraction program 104, feature analysis program 108, and/or queue attribute program 110 can be embodied as any combination of system software and/or application software. Further, the feature extraction program 104, feature analysis program 108, and/or queue attribute program 110 can be implemented using a set of modules 124. In this case, a module 124 can comprise a component that performs a set of actions used by the feature extraction program 104, feature analysis program 108, and/or queue attribute program 110. Further, it is understood that some of the actions discussed herein may not be implemented or additional actions may be implemented by computer system 102.

When the computer system 102 comprises multiple computing devices, each computing device can have only a portion of the feature extraction program 104, feature analysis program 108, and/or queue attribute program 110 installed thereon (e.g., one or more modules 124). However, it is understood that the computer system 102 is only representative of various possible equivalent computer systems that may implement the process described herein. To this extent, in other embodiments, the actions implemented by the computer system 102 can be at least partially implemented by one or more computing devices that include any combination of general and/or specific purpose hardware and/or program code. In each embodiment, the program code and hardware can be created using standard programming and engineering techniques, respectively.

Regardless, when the computer system 102 includes multiple computing devices, the computing devices can communicate over any type of communications link. Further, while performing the process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

It is understood that each of the process flows shown and described herein is only illustrative. To this extent, numerous variations of these process flows are possible, and are included within the scope of this invention. Illustrative variations include performing one or more processes in parallel and/or a different order, performing additional processes, not performing some processes, and/or the like. To this extent, the computer system 102, feature extraction program 104, feature analysis program 108, and/or queue attribute program 110 can utilize multiple tasks/threads/processes to perform the actions of the processes described herein.

It is further understood that aspects of the invention further provide various alternative embodiments. For example, in one embodiment, the invention provides a computer program stored on at least one computer-readable medium, which when executed, enables a computer system to perform the processes described above. To this extent, the computer-readable medium can include program code, such as the feature extraction program 104, feature analysis program 108, and/or queue attribute program 110, which implement some or all of the process described herein. It is understood that the term "computer-readable medium" comprises one or more of any type of tangible medium of expression capable of embodying a copy of the program code (e.g., a physical embodiment). For example, the computer-readable medium can comprise: one or more portable storage articles of manufacture; one or more memory/storage components of a computing device; a modulated data signal having one or more of its characteristics set and/or changed in such a manner as to encode information in the signal; paper; and/or the like.

In another embodiment, a computer system, such as the computer system 102, can be obtained (e.g., created, maintained, made available, etc.) and one or more programs/systems for performing the process described herein can be obtained (e.g., created, purchased, used, modified, etc.) and deployed to the computer system. To this extent, the deployment can comprise one or more of: (1) installing program code on a computing device from a computer-readable medium; (2) adding one or more computing devices to the computer system; and (3) incorporating and/or modifying the computer system to enable it to perform the process described herein.

Aspects of the invention can be also implemented as part of a business method that performs the process described herein on a subscription, advertising, and/or fee basis. That is, a service provider could offer to measure attributes of a queue, as described herein. In this case, the service provider can manage (e.g., create, maintain, support, etc.) some or all of the environment 100, such as the computer system 102, that performs the process described herein for one or more customers. In return, the service provider can receive payment from the customer(s) under a subscription and/or fee agreement, receive payment from the sale of advertising to one or more third parties, and/or the like.

The foregoing description of the preferred embodiments of this invention has been presented for purposes of illustration and description. It is not intended to be exhaustive or to limit the invention to the precise form disclosed, and obviously, many modifications and variations are possible.

What is claimed is:

1. A method for measuring an attribute of a queue, comprising:
   acquiring a plurality of images of a queue;
   extracting features from the images of the queue;
   analyzing, using at least one computer system, the extracted features; and
   measuring the attribute based on the analysis of the extracted features, wherein the attribute comprises a fullness of the queue that is determined based on a waiting line length of the queue, a length of the queue, a number of objects in the queue, and a density of the queue, wherein the density of the queue is equal to a ratio of the number of objects in the queue to the waiting line length of the queue;
   wherein the analyzing further comprises analyzing the extracted features at a plurality of successive time points to determine successive correspondences between the extracted features, wherein the measuring further comprises determining the fullness of the queue based on the successive correspondences, wherein the fullness of the queue is determined by comparing the waiting line length of the queue to the length of the queue, and wherein the queue is determined to be full if the waiting line length of the queue is about equal to the length of the queue and the density of the queue is above a predetermined threshold.

2. The method of claim 1, wherein the attribute further comprises an average moving speed at any point in the queue.

3. The method of claim 1, wherein the attribute further comprises an overall average moving speed of the entire queue.

4. The method of claim 1, wherein the attribute further comprises an average waiting time of an object to exit the queue at any point in the queue.

5. A system for measuring an attribute of a queue, comprising:
   at least one computer system, including:
      a system for acquiring a plurality of images of a queue;
      a system for extracting features from the images of the queue;
      a system for analyzing the extracted features; and
      a system for measuring the attribute based on the analysis of the extracted features, wherein the attribute comprises a fullness of the queue that is determined based on a waiting line length of the queue, a length of the queue, a number of objects in the queue, and a density of the queue, wherein the density of the queue is equal to a ratio of the number of objects in the queue to the waiting line length of the queue;
   wherein the system for analyzing is configured to analyze the extracted features at a plurality of successive time points to determine successive correspondences between the extracted features, wherein the system for measuring determines the fullness of the queue based on the successive correspondences, wherein the fullness of the queue is determined by comparing the waiting line length of the queue to the length of the queue, and wherein the queue is determined to be full if the waiting line length of the queue is about equal to the length of the queue and the density of the queue is above a predetermined threshold.

6. The system of claim 5, wherein the attribute further comprises an average moving speed at any point in the queue.

7. The system of claim 5, wherein the attribute further comprises an overall average moving speed of the entire queue.

8. The system of claim 5, wherein the attribute further comprises an average waiting time of an object to exit the queue at any point in the queue.

9. A program product stored on a non-transitory computer readable medium, which when executed, measures an attribute of a queue, the computer readable medium comprising program code for:
   acquiring a plurality of images of a queue;
   extracting features from the images of the queue;
   analyzing the extracted features; and
   measuring the attribute based on the analysis of the extracted features, wherein the attribute comprises a fullness of the queue that is determined based on a waiting line length of the queue, a length of the queue, a number of objects in the queue, and a density of the queue, wherein the density of the queue is equal to a ratio of the number of objects in the queue to the waiting line length of the queue;

wherein the analyzing further comprises analyzing the extracted features at a plurality of successive time points to determine successive correspondences between the extracted features, wherein the measuring further comprises determining the fullness of the queue based on the successive correspondences, wherein the fullness of the queue is determined by comparing the waiting line length of the queue to the length of the queue, and wherein the queue is determined to be full if the waiting line length of the queue is about equal to the length of the queue and the density of the queue is above a predetermined threshold.

10. A method for deploying an application for measuring an attribute of a queue, comprising:

providing a computer infrastructure being operable to:

acquire a plurality of images of a queue;

extract features from the images of the queue;

analyze the extracted features; and measure the attribute based on the analysis of the extracted features, wherein the attribute comprises a fullness of the queue that is determined based on a waiting line length of the queue, a length of the queue, a number of objects in the queue, and a density of the queue, wherein the density of the queue is equal to a ratio of the number of objects in the queue to the waiting line length of the queue;

wherein the analyzing further comprises analyzing the extracted features at a plurality of successive time points to determine successive correspondences between the extracted features, wherein the measuring further comprises determining the fullness of the queue based on the successive correspondences, wherein the fullness of the queue is determined by comparing the waiting line length of the queue to the length of the queue, and wherein the queue is determined to be full if the waiting line length of the queue is about equal to the length of the queue and the density of the queue is above a predetermined threshold.

* * * * *